(12) United States Patent
Li et al.

(10) Patent No.: US 9,374,158 B2
(45) Date of Patent: Jun. 21, 2016

(54) ELECTRONIC WAVEFRONT CORRECTION FOR FREE-SPACE OPTICAL COMMUNICATIONS

(75) Inventors: Guifang Li, Oviedo, FL (US); Inwoong Kim, Allen, TX (US); Xiaobo Xie, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1338 days.

(21) Appl. No.: 12/239,522

(22) Filed: Sep. 26, 2008

(65) Prior Publication Data

US 2010/0080565 A1    Apr. 1, 2010

(51) Int. Cl.
*H04B 10/00* (2013.01)
*H04B 10/112* (2013.01)
*H04B 10/61* (2013.01)
*H04B 10/64* (2013.01)

(52) U.S. Cl.
CPC ........ *H04B 10/1121* (2013.01); *H04B 10/6161* (2013.01); *H04B 10/6165* (2013.01); *H04B 10/64* (2013.01)

(58) Field of Classification Search
CPC .. H04B 10/11; H04B 10/112; H04B 10/1121; H04B 10/6161; H04B 10/6165; H04B 10/64
USPC .......................................... 398/119, 204, 208
See application file for complete search history.

(56) References Cited

U.S. PATENT DOCUMENTS

| | | | | |
|---|---|---|---|---|
| 3,532,889 A * | 10/1970 | Kompfner | ...................... | 398/119 |
| 7,826,752 B1 * | 11/2010 | Zanoni et al. | ................... | 398/205 |
| 7,899,340 B1 * | 3/2011 | Bontu et al. | ................... | 398/209 |
| 7,941,050 B2 * | 5/2011 | Harper et al. | ................. | 398/119 |
| 2009/0060511 A1 * | 3/2009 | Toyoshima et al. | ............. | 398/74 |

* cited by examiner

*Primary Examiner* — Tod T Van Roy
(74) *Attorney, Agent, or Firm* — William Greener; Bond, Schoeneck & King, PLLC

(57) ABSTRACT

Systems and methods of electronic wavefront correction are disclosed. An example method receiving an optical signal representing a wavefront traveling along a plurality of propagation paths, and electronically correcting distortion in the wavefront. An example apparatus includes an receiver and an electronic wavefront corrector. The receiver is configured to coherently receive an optical signal representing a wavefront traveling along a plurality of propagation paths. The electronic wavefront corrector is configured to correct phase distortion in the wavefront.

19 Claims, 7 Drawing Sheets

ELECTRONIC WAVEFRONT CORRECTION FOR FREE-SPACE OPTICAL COMMUNICATIONS

STATEMENT REGARDING FEDERALLY SPONSORED RESEARCH OR DEVELOPMENT

This invention was made with Government support under Agreement/Contract Number DAAD1702C9987, awarded by DARPA. The Government has certain rights in the invention.

FIELD OF THE DISCLOSURE

The present disclosure relates to free space optical communications and to coherent imaging using free space optical communications.

BACKGROUND

Free space optical communication (FSOC) uses light propagating in free space to transmit data between two points. Since no wave guide (e.g., fiber optic cable) is used, FSOC is also known as wireless optical communication. FSOC is generally used where a physical connection through fiber optic cable is impractical, due to high costs or other considerations. Typical applications of FSOC include communication between satellites, and connections between local area networks in a campus or metropolitan area.

Free space optical transmissions through the atmosphere are susceptible to several forms of distortion caused by atmospheric turbulence. One known technique to correct for this distortion is adaptive optics, in which a deformable (adaptive) mirror in the optical path changes shape over time to cancel distortion. Part of the corrected wavefront is split off to a wavefront sensor that measures residual distortion in the wavefront. A correction signal is calculated and sent to the deformable mirror, thus forming a feedback loop. However, correction in the optical domain is costly and relatively slow.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
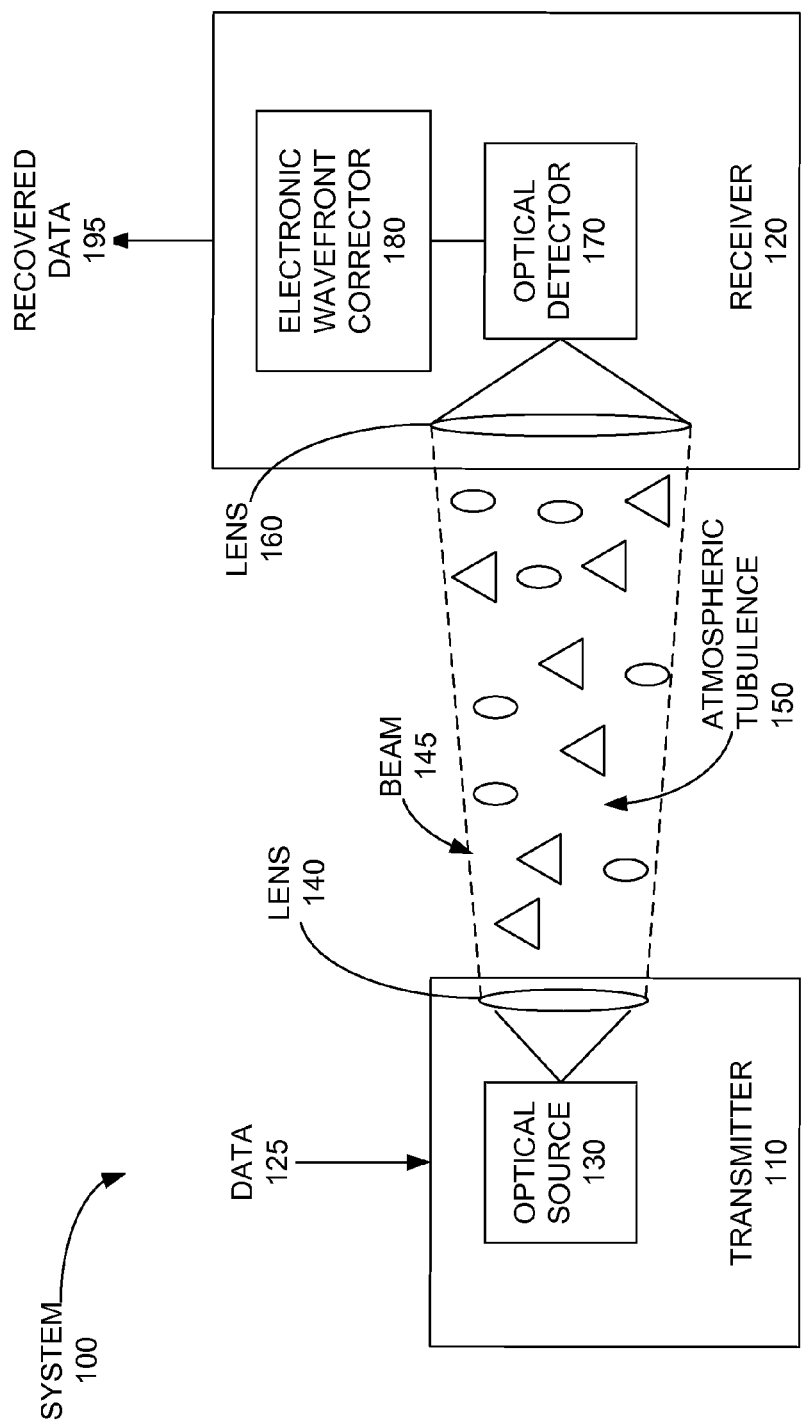
FIG. 1 is a block diagram of a communication system including an embodiment of a system and method of electronic wavefront correction for free-space optical communications.

FIG. 1 is a block diagram of a communication system including an embodiment of a system and method of electronic wavefront correction for free-space optical communications. System 100 includes a transmitter 110 and a receiver 120 in communication through free space. Although not illustrated, system 100 may also include various components such as amplifiers, repeaters, multiplexers, etc., as understood by a person of ordinary skill in the art.

Transmitter 110 receives data 125 which is used to modulate an optical source 130. The output of optical source 130 is focused by a lens 140 and then propagated into the atmosphere as beam (135).

Beam 135 travels through atmospheric turbulence 150 caused by wind and temperature gradients. Turbulence 150 includes pockets of air with rapidly varying densities and therefore fast-changing indices of optical refraction. These air pockets act like prisms and lenses with time-varying properties. The constantly changing index of refraction causes relatively large displacements of the transmitted beam (beam wander), and also cause the beam to spread out in transit, reducing the energy on the central axis. In addition, the changes in refraction cause some parts of the beam to slow more than others, distorting the uniform wavefronts that exited the transmitter. These small, random phase changes cause constructive and destructive interference.

After passing through turbulence 150, distorted beam 135 is received at receiver 120 and focused by lens 160. The focused beam is provided to an optical detector 170, which converts the optical signal representing the wavefront to an electrical signal representing the wavefront. The electrical signal includes phase information. Using this phase information, an electronic wavefront corrector 180 processes the signal electronically to remove, or correct for, the distortion produced by turbulence 150. After correction, receiver 120 further processes the signal electronically to recover the originally transmitted data, producing received data 185. Electronic wavefront corrector 180 will now be described in further detail in connection with FIGS. 2-5.

Figure 2:
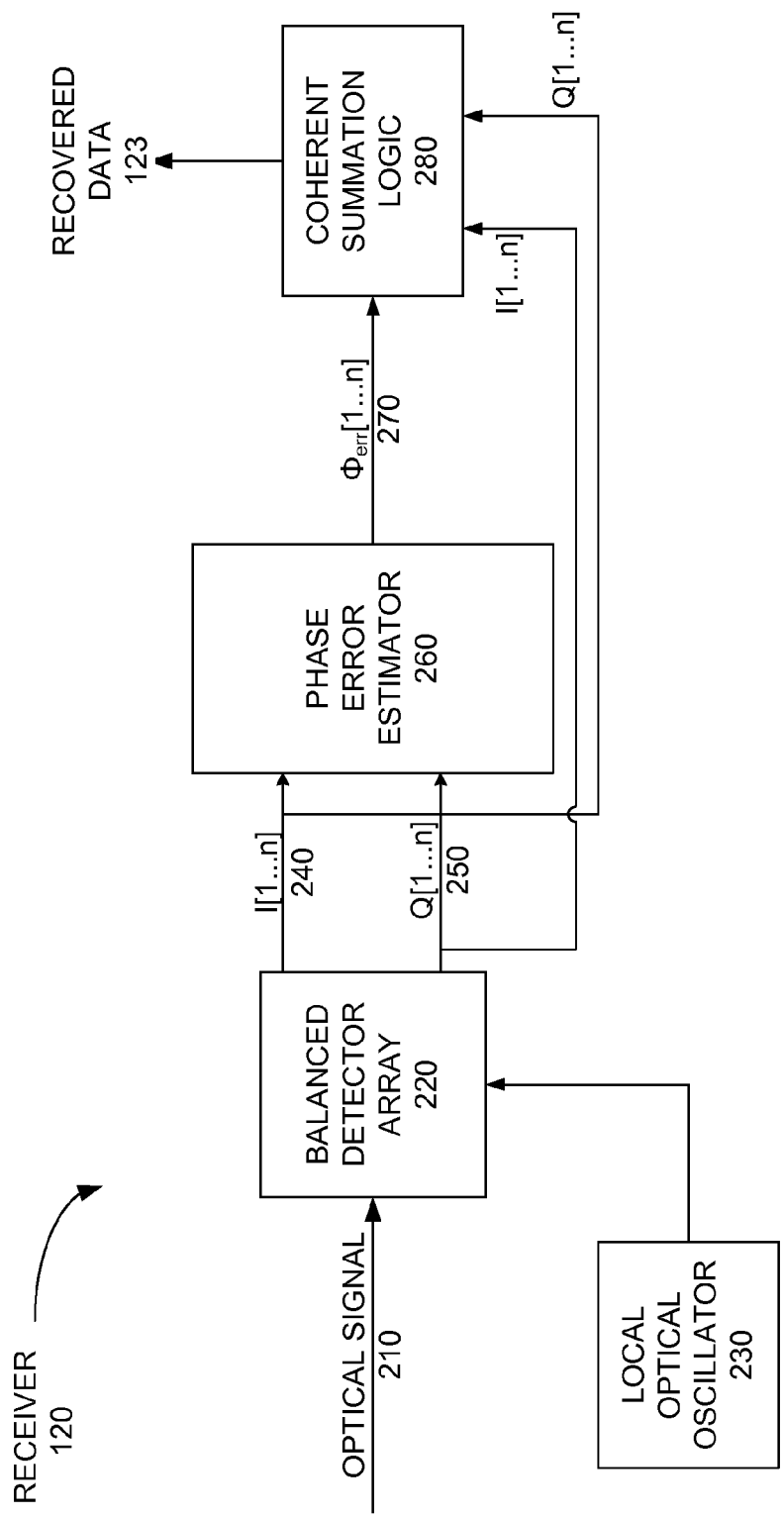
FIG. 2 is a block diagram of one embodiment of the receiver from FIG. 1.

FIG. 2 is a block diagram of receiver 120 from FIG. 1, showing further details of the operation of electronic wavefront corrector 180. By using a coherent receiver to obtain the complex field (amplitude and phase) of the wavefront, correction of the wavefront is performed in the electronic rather than the optical domain.

After being focused by lens 160, the received optical signal 210 is provided to an array of N balanced photodetectors (220). Balanced detector array 220 also receives an input from a local optical oscillator 230 (e.g., a tunable laser). Balanced detector array 220 measures the interference pattern produced by the combination of optical signal 210 and local optical oscillator 230, including in-phase and quadrature components.

The series of in-phase components I[1 ... N] (240) and quadrature components Q[1 ... N] (250) produced by balanced detector array 220 are provided to phase error estimator 260, which determines an estimation of the phase error $\phi_{err}[1 ... N]$ (270) in the received signal due to turbulence 150.

A coherent summation block 280 receives the phase elements 240 and 250 and the estimated phase error 270. Coherent summation block 280 combines individual I and Q phase elements in order to recover an electrical signal (corresponding to the optical signal) as it is received at multiple locations on array 220.

Figure 3:
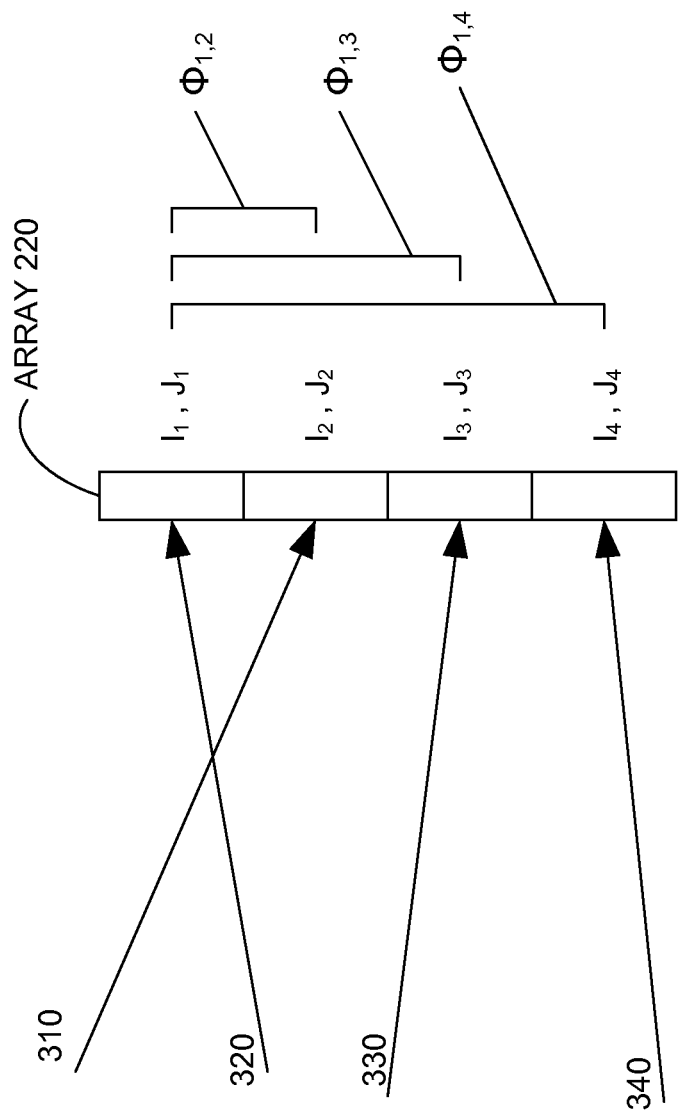
FIG. 3 is a block diagram of one embodiment of the detector array from FIG. 1.

This is illustrated in FIG. 3, which is a diagram of an example array 220. The wavefront generated by transmitter 110 travels through turbulence 150, which results in multiple propagation paths for the transmitted wavefront. Array 220 includes (in this example) four photodetectors, each of which receives an optical signal traveling along one of the propagation paths (310-340). Each photodetector produces a complex electric signal $I_j$, $Q_j$, corresponding to the received optical signal. The complex electrical signal $I_j$, $Q_j$ is provided to phase error estimator 260 and to coherent summation logic 280 as phase elements I[j] (240) and Q[j] (250). I[j] and Q[j] thus correspond to a particular propagation path through turbulence 150. Persons of ordinary skill in the art should appreciate that the phase components can be stored and manipulated in various ways. For example, in another embodiment a single array φ[1 ... N] is used to store both I and Q values, rather than using separate I and Q arrays.

Returning now to FIG. 2, estimated phase error $\phi_{err}[1 \ldots N]$ (270) contains estimated phase errors for each propagation path, relative to the first path. The estimated phase error array 270 thus provides complete information about wavefront distortion of the received optical signal. (These estimated phase errors $\phi_{err}$ are also illustrated in FIG. 3.) Coherent summation block 280 then coherently sums the recovered signal from each propagation path after removing the corresponding estimated phase error $\phi_{err}[j]$.

Figure 4:
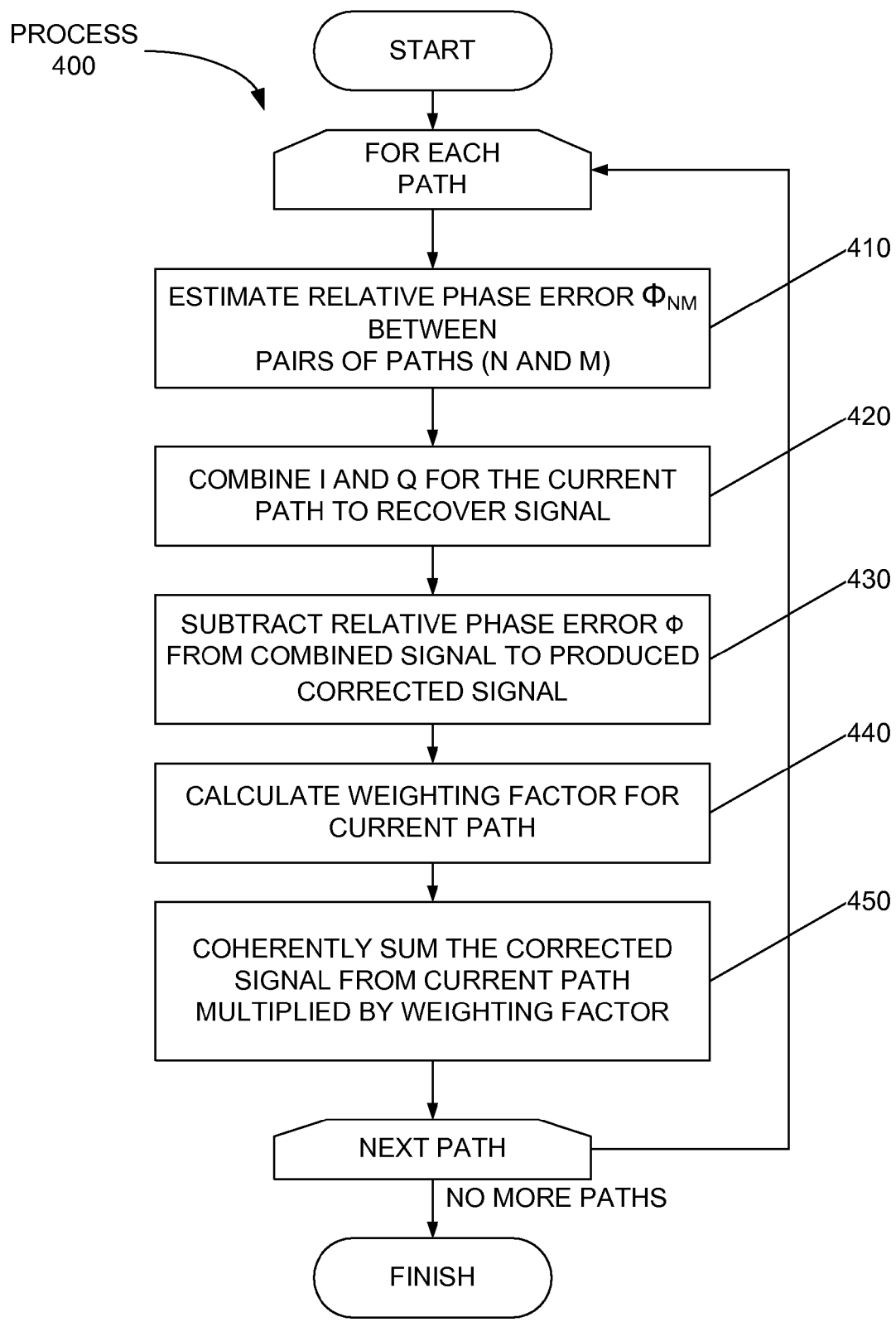
FIG. 4 is a flowchart illustrating operation of one embodiment of a system and method of electronic wavefront correction.

The phase error estimation and summation process will now be described in further detail in connection with the flowchart of FIG. 4. The process 400 constructively sum over all locations of array 220, and thus all propagation paths, by performing an iteration loop (blocks 410-450). The iteration begins at block 410, where the relative phase error $\phi_{n,m}$ between the path currently being processed and the first path is estimated according to Eq. 1:

$$\phi_{n,m} = \arg \sum_{k}^{L} \frac{Z_n(k)}{Z_m(k)/|Z_m(k)|} \quad \text{(Eq. 1)}$$

where n=1, Zm(k) is the measured complex electric field in the mth propagation path at the kth sampling time, and L is the size of the data block over which phase error is estimated. L is selected to average out the effect of shot noise in the error calculation. L can be much larger compared to the block size used for carrier phase noise estimation for data recovery since the relative phase noise due to wavefront distortion varies much more slowly compared to the phase noise (due to the finite beat line width of the transmitter laser and the local oscillator). However, L is small compared to the timescale of wavefront distortion due to atmospheric turbulence, which is of the order of milliseconds.

At block 420, I and Q components for the path currently being processed are combined which recovers the signal received on the path currently being processed. Next, at block 430 the relative phase error $\phi_j$ for the path currently being processed is subtracted from the recovered signal, producing a corrected signal for the path.

At block 440, a weighting factor is calculated for the path currently being processed. This allows any path which does not include any fractional power of the signal, but does include shot noise from local optical oscillator 230 to be dropped from the summation. The weighting factor is proportional to the magnitude of the electric field of the nth path, and is given by $$w_m = \sum_{k}^{L} |Z_m(k)|^r \bigg/ \sum_{n}^{M} \sum_{k}^{L} |Z_n(k)|^r,$$

where r=1 is optimal. (For details on deriving this formula, see "Electronic Wavefront Correction for PSK free-space optical communications", I. Kim, G. Goldfarb and G. Li, Electronics Letters, 27 Sep. 2007, which is hereby incorporated by reference herein.)

At block 450, the corrected signal from the path currently being processed (from block 420) is multiplied by the weighting factor for the path currently being processed (from block 440), and this value is accumulated into the weighted corrected signals from other paths. Blocks 410 through 450 are then repeated until all paths have been processed, at which point process 400 is then complete.

Figure 5:
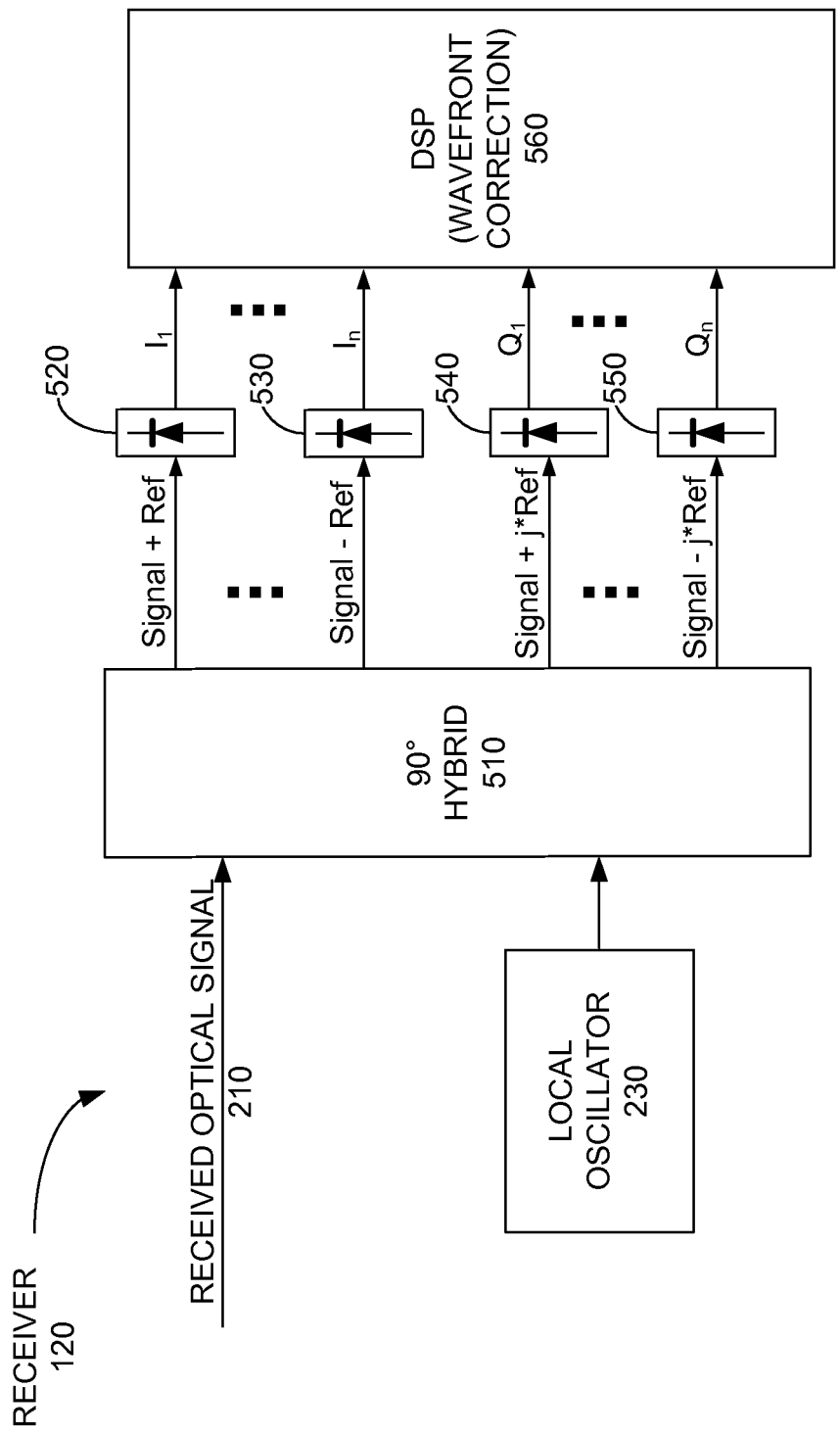
FIG. 5 is a block diagram of selected components in one embodiment of the receiver from FIG. 1.

FIG. 5 is a block diagram of selected components of one embodiment of receiver 120 from FIG. 2, showing further details of the optical and electrical components used this embodiment. The beam produced by local optical oscillator 230 is provided to an optical hybrid 510. Optical hybrid 510 mixes, in the complex-field space, received optical signal 210 with the four quadrature states associated with the oscillator signal, producing four different vectorial additions of the reference oscillator signal and the signal to be detected.

The levels of the four optical signals are detected by two pairs of detectors (520 and 530; 540 and 550). In this embodiment, single-ended detectors are used, but other variations are contemplated, such as balanced detectors. The four detected (electrical) signals are supplied to digital signal processor 560, which performs wavefront correction in the electronic domain, as described above in connection with FIGS. 2-4.

Figure 6:
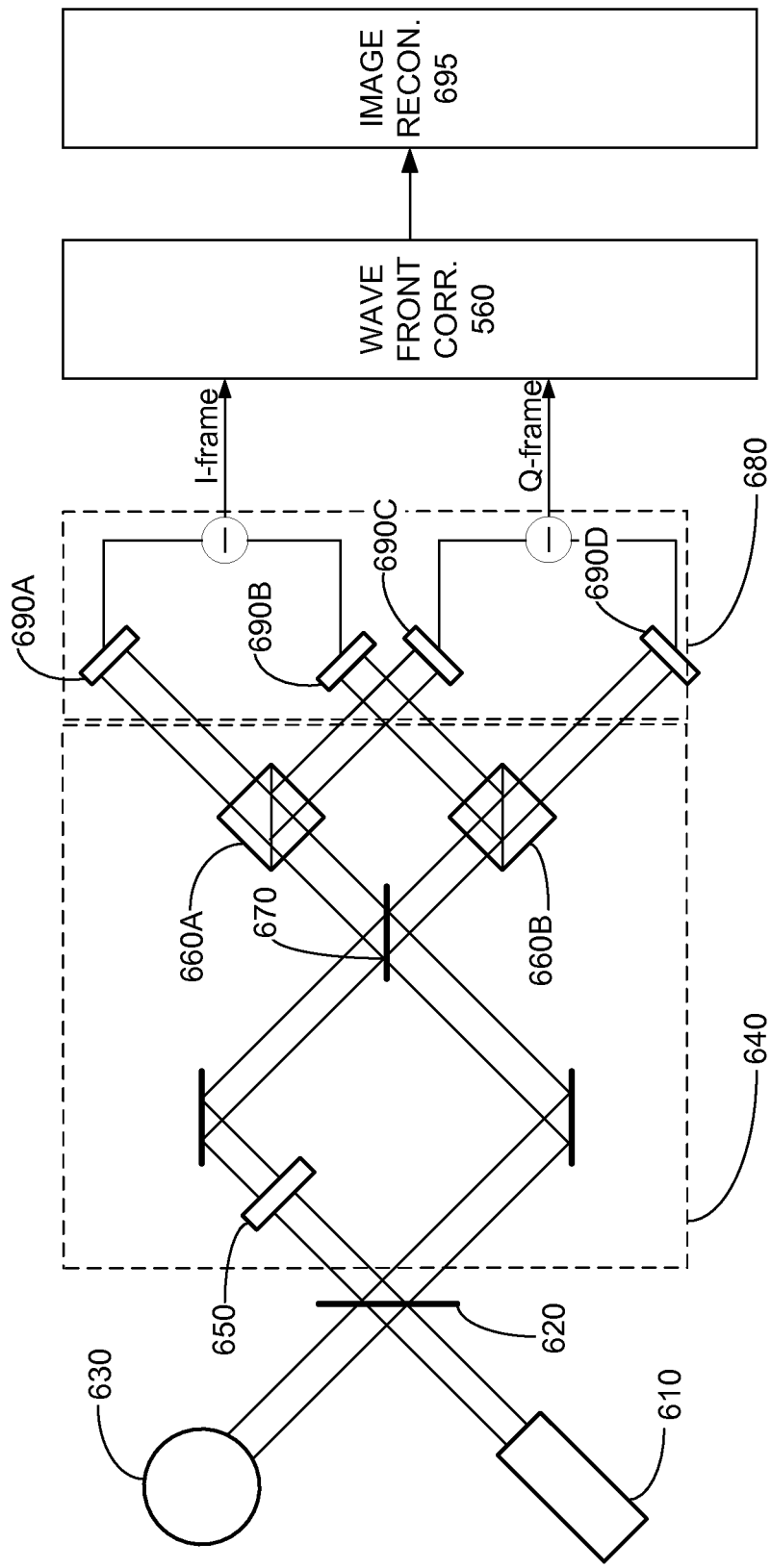
FIG. 6 is a block diagram of an example embodiment of a retinal imager using the techniques described above.

The techniques disclosed herein can be utilized in retinal imaging to improve image quality. FIG. 6 is a block diagram of an example embodiment of a retinal imager using the techniques described above. A laser 610 produces a beam which is split (by a half mirror 620) into two paths. One path illuminates the retina and the other path is used as the local oscillator. Light diffusely reflected back from the retina 630 is combined with the local oscillator through a free space ninety-degree hybrid 640. In this example, hybrid 640 is implemented by combining a quarter-wave plate 650 and two polarization beam splitters 660A, 660B. The combined signal (through half-mirror 670) is homodyne recorded by a balance detector 680, using four image sensors 690A-D to obtain the real and imaginary parts of wavefront. In some embodiments, charge-coupled devices (CCDs) are used as image sensors. To measure the eye aberration, a focused beam is sent to the retina and then the distorted wavefront is compared with a plane wave to determine aberration. After wavefront correction (logic 560), a broad-area light beam is used to illuminate the entire retina to obtain the image field (e.g., through CCDs), and then the retina image is digitally reconstructed by logic 695.

This coherent retinal imaging technique is more flexible and faster than conventional techniques such as scanning laser opthalmoscopy (which uses adaptive optics). This technique also offers other advantages. For example, system sensitivity is improved by increasing the reference laser power (important because laser power illuminating on retina is limited for safety reasons). In addition, image reconstruction from corrected wave-front field allows three-dimensional imaging, which eliminates the necessity to do sectioning as with scanning laser opthalmoscopy. Also, providing phase information as well as intensity information of the retina can reveal additional information about the structure of the retina in a live subject.

Figure 7:
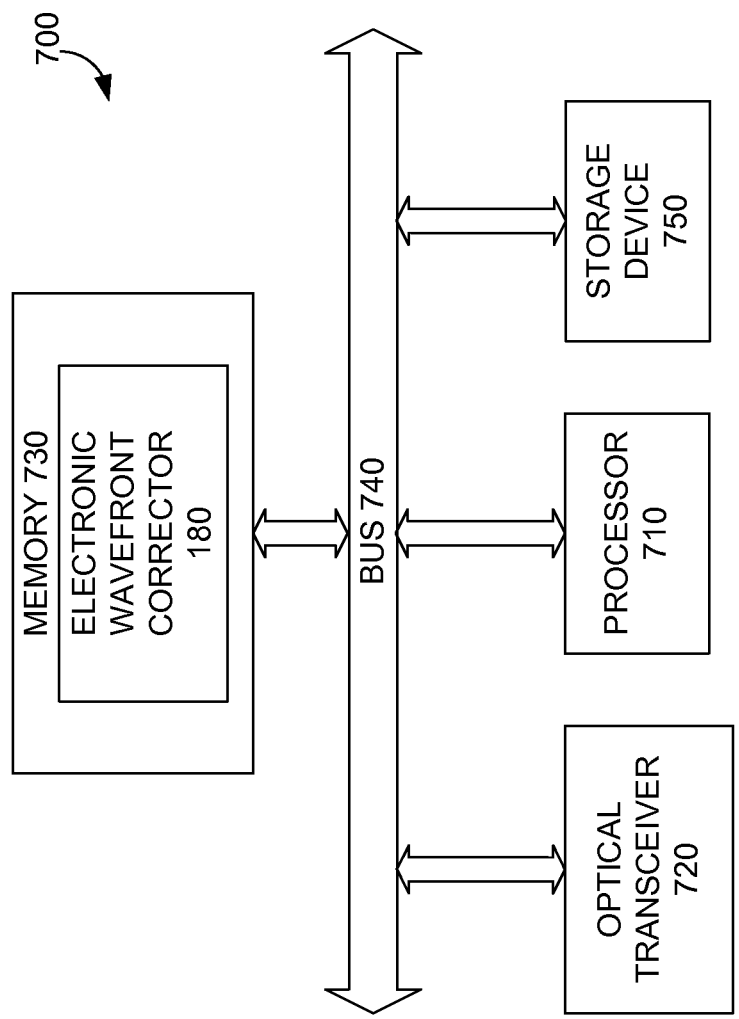
FIG. 7 is a block diagram of a computing device which can be used to implement various embodiments of systems and methods of electronic wavefront correction for free-space optical communications

FIG. 7 is a hardware block diagram of a computing device 700 which can be used to implement various embodiments of systems and methods of electronic wavefront correction for free-space optical communications. Computing device 700 contains a number of components that are well known in the computer arts, including a processor 710 (e.g., microprocessor, digital signal processor, microcontroller, digital signal controller), an optical transceiver 720, and memory 730. These components are coupled via a bus 740. Some embodiments also include a storage device 750, such as non-volatile memory or a disk drive. In the embodiment of FIG. 7, electronic wavefront corrector 180 resides in memory 730 as instructions which, when executed by processor 710, implement systems and methods of electronic wavefront correction for free-space optical communications. Omitted from FIG. 7 are a number of conventional components that are unnecessary to explain the operation of computing device 700.

In other embodiments (not shown), electronic wavefront corrector 180 is implemented in hardware, including, but not limited to, a programmable logic device (PLD), a programmable gate array (PGA), a field programmable gate array (FPGA), an application-specific integrated circuit (ASIC), a system on chip (SoC), and a system in package (SiP).

Electronic wavefront corrector 180, or both can be embodied in any computer-readable medium for use by or in connection with an instruction execution system, apparatus, or device. Such instruction execution systems include any processor-containing system, or other system that can fetch and execute instructions. In the context of this disclosure, a "computer-readable medium" can be any means that can contain or store the instructions for use by the instruction execution system. The computer readable medium can be, for example but not limited to, a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method comprising:
   receiving single optical signal representing a wavefront traveling along a plurality of propagation paths through free space, wherein the single optical signal is received at a balanced photodetector array; and
   electronically removing phase error in the received single optical signal that is a result of the travel through free space by:
      obtaining a complex field for each propagation path of the single optical signal, the complex field comprising an I phase element and a Q phase element corresponding to each propagation path;
      determining, for each propagation path of the single optical signal, an estimated phase error directly from the I phase element and the Q phase element for the propagation path, wherein the estimated phase error is determined relative to another one of the propagation paths;
      combining the I phase element and the Q phase element of each of the propagation paths to obtain a recovered electrical signal for each propagation path; and
      coherently summing the recovered electrical signal from each propagation path after removing the corresponding phase error.

2. The method of claim 1, wherein the receiving the optical signal comprises coherently receiving the optical signal.

3. The method of claim 1, further comprising
   calculating a weighting factor for each propagation path which is proportional to the magnitude of the electrical signal of the corresponding propagation path.

4. The method of claim 1, wherein each of the estimated phase errors is a relative phase error determined relative to the same propagation path.

5. The method of claim 1, wherein the determining the estimated phase error comprises estimating over a data block size L.

6. The method of claim 1, wherein the determining the estimated phase error comprises estimating over a data block size L which is selected to average out the effect of shot noise in the error calculation.

7. The method of claim 1, wherein the electronically removing phase error in the received optical signal that is a result of the travel through free space further comprises:
   for each propagation path:
      subtracting the estimated phase error from the corresponding recovered electrical signal to remove the corresponding phase error from the corresponding recovered electrical signal and to produce a corrected signal for the propagation path;
      calculating a weighting factor for the propagation path which is proportional to the magnitude of the complex field of the propagation path; and
   wherein the step of coherently summing the recovered electrical signal from each propagation path further comprises the steps of multiplying the corrected signal for the propagation path by the weighting factor for the propagation path to produce a weighted corrected signal for the path; and
   summing the weighted corrected signal for the path with the weighted corrected signals for the other paths.

8. The method of claim 1, further comprising:
   detecting the optical signal in an array of optical detectors to produce a corresponding plurality of complex electrical field signals; and
   removing a plurality of relative phase errors between the complex electrical field signals.

9. The method of claim 1, further comprising:
   determining, for each propagation path, an estimated phase error relative to each of the other propagation paths; and
   coherently summing the recovered signal from each propagation path by removing the corresponding estimated phase errors.

10. An apparatus comprising:
an optical receiver configured to coherently receive an optical wavefront of a single optical signal traveling along a plurality of propagation paths through free space, the optical wavefront representing a data signal, the optical receiver comprising an array of detectors, each detector configured to receive the wavefront of the single optical signal along a corresponding one of the propagation paths; and
an electric wavefront corrector configured to correct relative phase differences between the wavefronts of the single optical signal received at the array of detectors, wherein the electronic wavefront corrector is further configured to, for each propagation path:
obtain a complex field of the propagation path, the complex field comprising I and Q phase elements of the propagation path,
determine an estimated phase error for the propagation path directly from the I and Q phase elements of the propagation path, wherein the estimated phase error is determined relative to another one of the propagation paths,
combine the I and Q phase elements of the propagation path to recover an electrical signal corresponding to the propagation path, and
subtract the estimated phase error from the corresponding recovered electrical signal to produce a corrected signal for the propagation path,
calculate a weighting factor for the propagation path which is proportional to the magnitude of the complex field of the propagation path,
multiply the corrected signal for the propagation path by the weighting factor for the propagation path to produce a weighted corrected signal for the path, and
sum the weighted corrected signal for the path with the weighted corrected signals for all other paths.

11. The apparatus of claim 10, the electronic wavefront corrector comprising:
a phase error estimator producing an estimated phase error for each propagation path; and
a coherent summator configured to coherently sum recovered electrical signals from each propagation path after removing the corresponding estimated phase error.

12. The apparatus of claim 11, the coherent summator further configured to calculate a weighting factor for each propagation path which is proportional to the magnitude of the complex field of the corresponding propagation path.

13. The apparatus of claim 11, wherein each of the estimated phase errors is determined relative to the same propagation path.

14. The apparatus of claim 11, the phase error estimator further configured to estimate over a data block size L.

15. The apparatus of claim 11, the phase error estimator further configured to estimate over a data block size L which is selected to average out the effect of shot noise in the error calculation.

16. The apparatus of claim 10, wherein each detector produces a complex field signal corresponding to each propagation path.

17. The apparatus of claim 16, the receiver further comprising:
a local oscillator producing a reference signal; and
an optical hybrid configured to mix the received optical signal with a plurality of quadrature states associated with the reference signal and to produce a corresponding plurality of vectors,
wherein the corresponding plurality of vectors is supplied to the electronic wavefront corrector.

18. A system comprising:
a transmitter configured to transmit single optical signal into free space, the single optical signal corresponding to a wavefront traveling along a plurality of propagation paths through the free space, at least one of the propagation paths passing through at least one atmospheric disturbance;
an optical receiver configured to coherently receive the wavefront of the single optical signal traveling along the plurality of propagation paths through the free space; and
an electronic wavefront corrector configured to correct phase distortion in the received wavefront resulting from the at least one atmospheric disturbance, wherein the electronic wavefront corrector is further configured to, for each propagation path:
obtain a complex field signal of the propagation path, the complex field signal comprising I and Q phase elements of the propagation path;
determine an estimated phase error for the propagation path directly from the I and Q phase elements of the propagation path, wherein the estimated phase error is determined relative to another one of the propagation paths,
combine the I and Q phase elements of the propagation path to recover an electrical signal corresponding to the propagation path,
subtract the estimated phase error from the corresponding recovered electrical signal to produce a corrected signal for the propagation path,
calculate a weighting factor for the propagation path which is proportional to the magnitude of the complex field signal of the propagation path,
multiply the corrected signal for the propagation path by the weighting factor for the propagation path to produce a weighted corrected signal for the path; and
sum the weighted corrected signal for the path with the weighted corrected signals for all other paths.

19. The system of claim 18, the receiver further comprising an array of optical detectors, each optical detector corresponding to one of the propagation paths, each optical detector configured to produce one of a corresponding plurality of complex electrical field signals, wherein the electronic wavefront corrector is further configured to remove a plurality of relative phase errors between the complex electrical field signals.

* * * * *